Dec. 6, 1949     S. ROGERS     2,490,094
SAW HOLDER
Filed Oct. 26, 1945
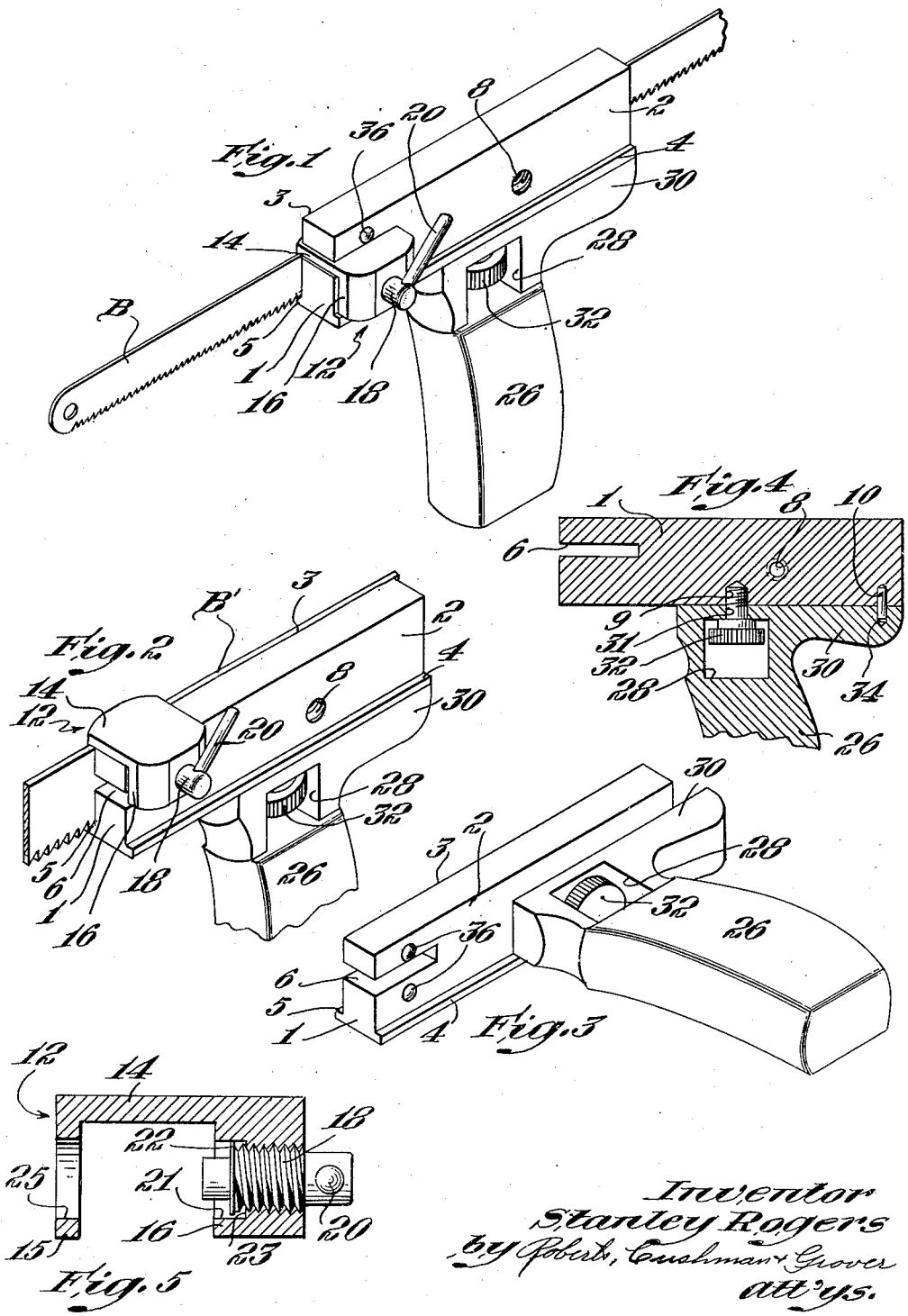
Inventor
Stanley Rogers
by Roberts, Cushman & Grover
att'ys.

Patented Dec. 6, 1949

2,490,094

UNITED STATES PATENT OFFICE 2,490,094

SAW HOLDER

Stanley Rogers, Boston, Mass.

Application October 26, 1945, Serial No. 624,737

2 Claims. (Cl. 145—108)

This invention relates to a holder for saw blades or the like cutting implements and its principal object is to provide a simple and reliable device capable of holding a saw blade or the like in any one of a plurality of positions so as to permit a more efficient and convenient use of the device than would otherwise be possible, and also to permit its use in confined quarters which otherwise might be inaccessible with saws of the conventional construction.

Further objects relate to various features of construction and will be apparent from a consideration of the following description and the accompanying drawings, wherein:

Fig. 1 is a perspective view of a saw holder constructed in accordance with the present invention, showing a small hack saw blade clamped in one of four possible positions;

Fig. 2 is a view similar to Fig. 1, but showing a larger saw blade clamped in place;

Fig. 3 is a perspective view of the holder showing the handle or grip in a different position than that shown in Figs. 1 and 2;

Fig. 4 is a longitudinal vertical section through the holder; and

Fig. 5 is an enlarged transverse section through the clamping member.

The embodiment herein shown for the purpose of illustration comprises an elongate body member 1 of substantially rectangular cross-section with its opposite faces 2 and 3 formed with elongate outstanding ribs or flanges 4 and 5 which define flat or square abutments or shoulders against which either the cutting edge or the back edge of a hack saw blade B or the like implement may be squarely seated, as shown in Figs. 1 and 2. One end of the body member is formed with a slot 6 (Fig. 3) which extends from one side face to the other. The opposite sides of the body member are bored and tapped to provide a threaded hole 8, and the bottom wall is provided with a threaded hole 9 and an opening which receives a positioning pin 10, as shown in Fig. 4.

A U-shaped clamping member 12 (Fig. 5) is formed with a central body portion 14 designed both to fit snugly into the slot 6, in the manner illustrated in Fig. 1, and to fit about or straddle the upper face of the body member, as shown in Fig. 2, with its legs 15 and 16 overlying the opposite faces 2 and 3. One of the legs 16 is provided with a transversely extending bore 21 which is threaded as shown to receive a clamping screw 18, the outer end of which carries a handle or operating lever 20. In order to prevent accidental removal of the screw its inner end portion may be formed with an annular flange 22 engageable with the annular shoulder defined by the junction to the inner end of the threaded area and enlarged bore 21, and to this end the opposite leg or jaw 15 is provided with an opening 25 which permits the parts 21—23 to be formed.

A pistol-grip or handle 26 is detachably secured to one of the side faces 2 and 3, or the bottom face in the manner shown in Figs. 3 and 4, and to this end the grip 26 is formed with an opening 28 adjacent to its inner flat end portion 30 which is provided with an aperture 31 through which the shank of a thumb screw 32 projects and a second aperture 34 to receive the projecting end of the pin 10. The construction and arrangement of parts are such that when the grip 26 is applied against the bottom wall of the body member with the pin projecting into the aperture 34, the shank or screw 32 registers with the threaded aperture 9 so that the screw may be readily tightened as shown in Fig. 4, and similarly when the grip 26 is applied to one of the opposite side faces 2 and 3, the screw 32 may be threaded in aperture 8 with the edge of the end portion 30 contiguous to the inner face of one of the shoulders 4 or 5, as the case may be. In any event the screw 32 cooperates either with one of the shoulders 4, 5 or with the pin 10, so as rigidly to hold the grip in selected position.

In using the holder with a narrow hack saw of conventional size, the body of the clamp 12 is positioned in the slot 6, as illustrated in Fig. 1, with its jaw 15 juxtaposed to the side face against which the blade B is to be positioned, and the clamp 12 cooperates with one of the shoulders 4, 5 so that the blade B may be firmly held in any one of four positions, viz., (a) with its teeth against shoulder 4, (b) with its teeth against shoulder 5, (c) with its back edge against shoulder 4, or (d) with its back edge against shoulder 5. The grip 26 may also be held in any one of three positions, viz., with its end 30 against the bottom wall of the body member as shown in Fig. 1, or against one of the two side faces of the body member, as illustrated in Fig. 3, in which case the blade B will more advantageously be secured in one of the two positions on the opposite face of the body portion. Thus the parts may be assembled into any one of eight positions, each having its advantages, depending upon circumstances or locations in which the saw is to be used.

When using a large size blade or the like cutting implement such as the blade B' (Fig. 2), the clamp 12 is positioned so as to straddle the upper edge of the body portion with its depending jaw 15 juxtaposed to one of the side faces so as to engage the body portion of the blade B', thereby cooperating with the adjacent shoulder portion, 4 or 5, to hold the blade in any one of the four positions above described. The grip may likewise be positioned in any one of the positions above described so that with a large sized blade the parts may be assembled in any one of eight positions with the attendant advantages.

In order to insure a firm clamping action and to avoid accidental displacement of the clamp, the side walls of the body member may be provided with a plurality of spaced recesses 36 (Fig. 3) disposed to receive the inner end of the clamping screw 18, such an arrangement allowing the screw to be loosened sufficiently to remove or readjust the blade without danger of the clamp 12 becoming accidentally detached from the body member. It will also be noted that the construction and arrangement herein shown not only permits the use of blades of different lengths and sizes, but also permits lengthwise adjustment of the blade so as to vary the effective length of its cutting edge.

While I have shown and described one desirable embodiment of the invention it is to be understood that this disclosure is for the purpose of illustration and various changes and modifications may be made without departing from the spirit and scope of the invention as set forth in the appended claims.

I claim:

1. A holder for a hack saw blade or the like cutting implement comprising an elongate body member of substantially rectangular cross section, one face of which is formed with an outstanding flange defining an abutment against which one edge of a hack saw blade or the like may be squarely positioned while the blade rests against said one face, one end of said body member being formed with a slot extending from one face to the opposite face, and a U-shaped clamping member having legs spaced apart a distance at least equal to the combined thickness of said body member and saw blade, said clamping member being adapted to be selectively positioned so as to straddle said body portion so that the bottom of the U-shaped member may seat on one edge surface of said body or be disposed in said slot and in either position with one leg engaging one face of said body member and its other leg engaging a saw blade positioned against said abutment, one of said legs carrying a clamping element operative to clamp the parts together.

2. A holder for a hack saw blade or the like cutting element comprising an elongate body member of substantially rectangular cross section formed at one end with a slot extending from one face to the opposite face, an outstanding flange formed on one of the faces and defining a flat abutment spaced from said slot against which one edge of a hack saw blade or the like may be squarely positioned while the blade rests against said one face, a substantially U-shaped clamping member having legs spaced apart at least the width of said body member plus the thickness of said saw blade, the thickness of the bottom portion of the U-shaped member being less than the width of said slot so that said U-shaped member may be slidably disposed in said slot with one of its clamping legs overlying a portion of said one face and saw blade and its other clamping leg overlying the opposite face, a clamping element carried by said U-shaped member and operative to clamp the body portion of said blade against said one face when its edge is positioned against said abutment, and a grip member secured to said body portion.

STANLEY ROGERS.

REFERENCES CITED

The following references are of record in the file of this patent:

UNITED STATES PATENTS

| Number | Name | Date |
|---|---|---|
| 283,876 | Firm | Aug. 28, 1883 |
| D. 19,779 | Gardner | Apr. 29, 1890 |
| 1,191,810 | Miller | July 18, 1916 |
| 1,398,342 | Pleaue | Nov. 29, 1921 |
| 1,731,093 | Bouquet | Oct. 8, 1929 |
| 2,307,411 | Leatherman | Jan. 5, 1943 |

FOREIGN PATENTS

| Number | Country | Date |
|---|---|---|
| 11,663 | Great Britain | May 12, 1914 |